(12) United States Patent
Chen et al.

(10) Patent No.: US 11,287,005 B2
(45) Date of Patent: Mar. 29, 2022

(54) HOURGLASS TYPE AIR SPRING ASSEMBLY

(71) Applicant: ZHUZHOU TIMES NEW MATERIAL TECHNOLOGY CO., LTD., Hunan (CN)

(72) Inventors: Wenhai Chen, Hunan (CN); Te Ye, Hunan (CN); Canhui Chen, Hunan (CN); Haitao Cheng, Hunan (CN); Xuan Peng, Hunan (CN); Zhuangbing Jin, Hunan (CN); Jun Zhou, Hunan (CN); Qiang Chen, Hunan (CN)

(73) Assignee: ZHUZHOU TIMES NEW MATERIAL TECHNOLOGY CO., LTD., Hunan (CN)

( * ) Notice: Subject to any disclaimer, the term of this patent is extended or adjusted under 35 U.S.C. 154(b) by 147 days.

(21) Appl. No.: 16/647,022

(22) PCT Filed: Aug. 2, 2018

(86) PCT No.: PCT/CN2018/098204
§ 371 (c)(1),
(2) Date: Mar. 13, 2020

(87) PCT Pub. No.: WO2019/080574
PCT Pub. Date: May 2, 2019

(65) Prior Publication Data
US 2020/0208703 A1 Jul. 2, 2020

(30) Foreign Application Priority Data
Oct. 27, 2017 (CN) .......................... 201711020930.3

(51) Int. Cl.
*F16F 9/05* (2006.01)
*F16F 9/04* (2006.01)
(Continued)

(52) U.S. Cl.
CPC .......... *F16F 9/0454* (2013.01); *F16F 13/002* (2013.01); *B60G 2204/4502* (2013.01);
(Continued)

(58) Field of Classification Search
CPC .... F16F 9/04; F16F 9/0454; F16F 9/05; F16F 9/052; F16F 9/057; F16F 13/002;
(Continued)

(56) References Cited

U.S. PATENT DOCUMENTS 4,690,388 A * 9/1987 Harrison .................. B60G 7/04
267/35
4,841,874 A * 6/1989 Weigel ...................... B61F 5/24
105/199.4

(Continued)

FOREIGN PATENT DOCUMENTS

CN 106337894 1/2017
CN 107740833 2/2018
(Continued)

OTHER PUBLICATIONS

"International Search Report (Form PCT/ISA/210) of PCT/CN2018/098204", dated Sep. 29, 2018, with English translation thereof, pp. 1-4.

*Primary Examiner* — Thomas W Irvin
(74) *Attorney, Agent, or Firm* — JCIP Global Inc.

(57) ABSTRACT

An hourglass type air spring assembly includes an upper cover plate, an air bag, an upper end plate and a lower end plate. An outer periphery of the upper cover plate is connected with an outer periphery of the upper end plate through the air bag. A low-position hourglass elastomer and a high-position elastomer which are integrally formed are connected with each other between the upper end plate and the lower end plate. An annular notch is formed between the low-position hourglass elastomer and the high-position elas-
(Continued)

tomer, and an annular rigid partition plate matched with the annular notch is arranged in the annular notch.

9 Claims, 2 Drawing Sheets

(51) Int. Cl.
    *F16F 13/00*     (2006.01)
    *F16F 15/02*     (2006.01)
    *F16F 15/023*     (2006.01)

(52) U.S. Cl.
    CPC ...... *B60G 2206/424* (2013.01); *F16F 15/022* (2013.01); *F16F 15/0232* (2013.01)

(58) Field of Classification Search
    CPC ............... F16F 15/022; F16F 15/0232; B60G 2204/4502; B60G 2206/424
    See application file for complete search history.

(56) References Cited

U.S. PATENT DOCUMENTS

| | | | | |
|---|---|---|---|---|
| 6,257,561 B1 * | 7/2001 | Nakayama | ................ | B61F 5/08 |
| | | | | 267/64.19 |
| 6,276,674 B1 * | 8/2001 | Randell | ................ | F16F 1/3713 |
| | | | | 267/141.4 |
| 8,511,653 B2 * | 8/2013 | Fujimoto | ................ | F16F 9/052 |
| | | | | 267/64.27 |
| 8,540,220 B2 * | 9/2013 | Sawa | .................... | F16F 9/0454 |
| | | | | 267/3 |
| 10,435,044 B2 * | 10/2019 | Sawa | ........................ | B61F 5/10 |
| 10,449,979 B2 * | 10/2019 | Sawa | ........................ | F16F 9/44 |
| 10,563,719 B2 * | 2/2020 | Sawa | .................... | F16F 9/0454 |
| 2006/0170140 A1 * | 8/2006 | Menk | ........................ | F16F 3/08 |
| | | | | 267/35 |
| 2009/0039574 A1 * | 2/2009 | Cook | .................... | F16F 9/052 |
| | | | | 267/3 |
| 2013/0313764 A1 * | 11/2013 | Fujimoto | ................. | B61F 5/10 |
| | | | | 267/64.27 |
| 2014/0230687 A1 * | 8/2014 | Jackson, Jr. | ........... | B60G 11/62 |
| | | | | 105/198.1 |
| 2015/0219177 A1 * | 8/2015 | Ura | ........................ | F16F 9/05 |
| | | | | 267/64.27 |
| 2016/0252153 A1 * | 9/2016 | Haraguchi | ................. | F16F 1/40 |
| | | | | 267/64.27 |
| 2018/0023652 A1 * | 1/2018 | Byron | ...................... | F16F 9/04 |
| | | | | 267/64.27 |

FOREIGN PATENT DOCUMENTS

| | | |
|---|---|---|
| EP | 1045167 | 10/2000 |
| JP | 2010060016 | 3/2010 |
| WO | 2012042813 | 4/2012 |

\* cited by examiner

HOURGLASS TYPE AIR SPRING ASSEMBLY

CROSS-REFERENCE TO RELATED APPLICATION

This application is a 371 of international application of PCT application Ser. No. PCT/CN2018/098204, filed on Aug. 2, 2018, which claims the priority benefit of China application no. 201711020930.3, filed on Oct. 27, 2017. The entirety of each of the above mentioned patent applications is hereby incorporated by reference herein and made a part of this specification.

BACKGROUND

Technical Field

The invention mainly relates to the buffering and damping technology, more particularly relates to an hourglass type air spring assembly.

Description of Related Art

The air spring assembly is widely applied in railway cars, overload vehicles and other important buffering or damping occasions. Usually, this spring assembly comprises an elastomer located between a pair of rigid end plates. The elastomer is made of rubber, and compressed by loads acted on the spring assembly. In the prior art, the hourglass type secondary spring has lower vertical rigidity at low loads, so the comfort is very good, however, at high loads, the nonlinearity of the hourglass type secondary spring results in great vertical rigidity at high loads, and seriously affects the comfort, while for some heavy haul trains, particularly for double-deck multiple unit trains, the vertical rigidity of the secondary spring is required to be very small at high loads, therefore, the existing hourglass type secondary spring cannot meet this requirement.

SUMMARY

The objects in the invention is in view of the abovementioned problems of the prior art, and provide a hourglass type air spring assembly, which is simple in structure, convenient to install, low in heavy-load vertical rigidity and high in comfort and stability.

To solve the aforesaid problems, the following technical solutions can be adopted:

An hourglass type air spring assembly comprises an upper cover plate, an air bag, an upper end plate and a lower end plate. An outer periphery of the upper cover plate is connected with an outer periphery of the upper end plate through the air bag. A low-position hourglass elastomer and a high-position elastomer which are integrally formed are connected with each other between the upper end plate and the lower end plate, and an annular notch is formed between the low-position hourglass elastomer and the high-position elastomer, and an annular rigid partition plate matched with the annular notch is arranged in the annular notch.

As further improvement of the above technical solution:

Preferably, a bottom surface of the annular rigid partition plate is set as a flat surface, and a top surface of the annular rigid partition plate is formed by a flat surface portion and an inclined surface portion. The flat surface portion on a top part of the annular rigid partition plate is close to an outer periphery thereof, and a low position of the inclined surface portion of the annular rigid partition plate is close to an inner ring thereof.

Preferably, the outer periphery of the annular rigid partition plate is provided with a fail-safe gap.

Preferably, the fail-safe gap is located outside of the annular notch.

Preferably, an inner cavity is provided in a center of the low-position hourglass elastomer and a center of the high-position elastomer, and a bottom center of the upper end plate is provided with a stop part extending to inner cavity.

Preferably, a top surface of the upper end plate is provided with a counter bore for losing weight.

Preferably, the counter bore is internally provided with a plurality of spaced-apart rib plates. A top part of the upper end plate is provided with a wearing plate which is fastened with each of the rib plates.

Preferably, a bottom part of an outer peripheral face of the upper cover plate is provided with a retaining ring; one end of the air bag is buckled with the retaining ring, and the other end of the air bag is connected with the upper end plate.

Compared with the prior art, the invention has the following advantages.

The hourglass type air spring assembly of the present invention comprises an upper cover plate, an air bag, an upper end plate and a lower end plate. The outer periphery of the upper cover plate is connected with the outer periphery of the upper end plate through the air bag. The low-position hourglass elastomers and the high-position elastomers which are integrally formed are connected with each other between the upper end plate and the lower end plate. The annular notches are formed between the low-position hourglass elastomers and the high-position elastomers, and the annular rigid partition plates matched with the annular notches are arranged in the annular notches. In this structure, the low-position hourglass elastomers and the high-position elastomers integrally formed as one piece constitute a serial structure which increases the elevation of the elastomer between the upper end plate and the lower end plate, thereby greatly reducing the heavy-load vertical rigidity of the secondary spring and improving the comfort of the secondary spring at heavy loads. In addition, while the elevation increases, the transverse displacement of the elastomer between the upper end plate and the lower end plate is also increased. In this structure, the low-position hourglass elastomer is incompletely isolated from the high-position elastomer through the coordination of the annular rigid partition plate and the annular notch, which is arranged between the low-position hourglass elastomer and the high-position elastomer, so as to avoid the transverse deformation of the secondary spring and improve the stability of the transverse displacement of the secondary spring. In this structure, the annular rigid partition plate is coordinated with the annular notch. The structure is simple. The annular rigid partition plate will not damage the low-position hourglass elastomer and the high-position elastomer during installation, which improves installation convenience and ensures the completeness of the low-position hourglass elastomers and the high-position elastomers.

DESCRIPTION OF THE EMBODIMENTS

The present invention will be further clarified based on the following figures and embodiments.

Figure 1:
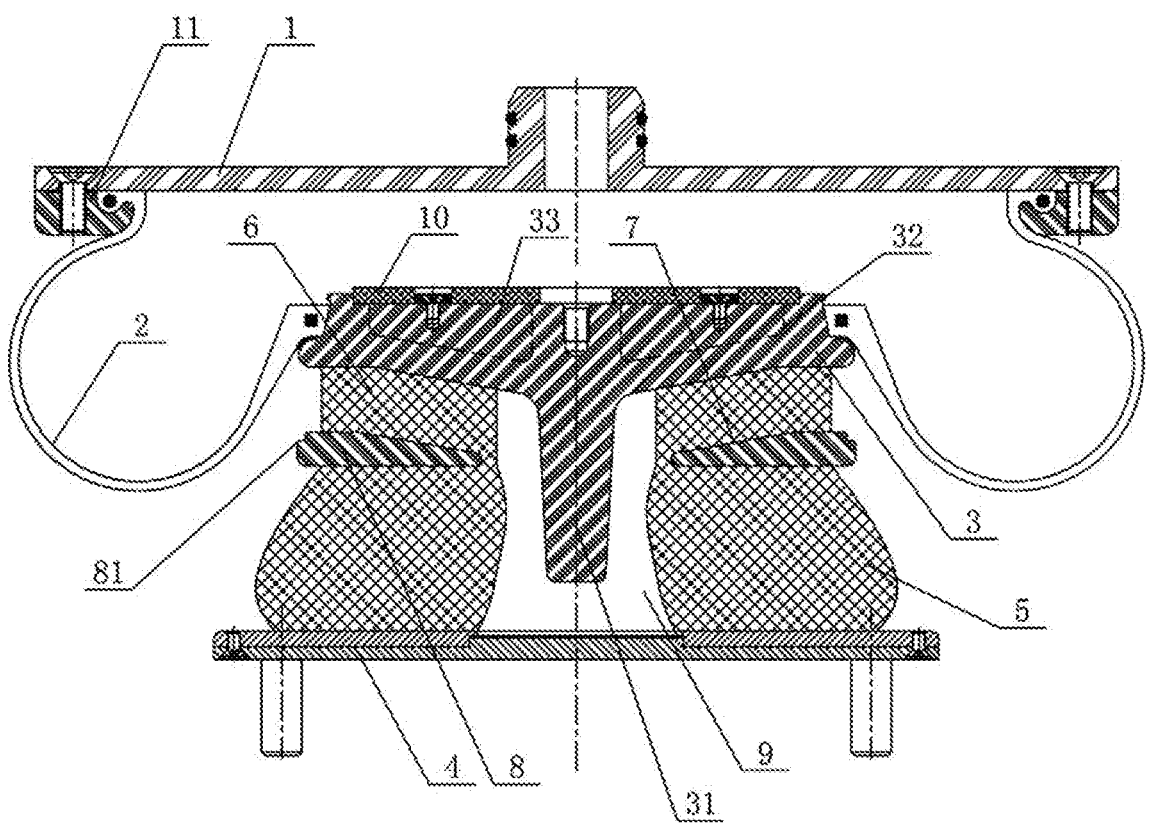
FIG. 1 is a structure diagram of the present invention.
Figure 2:
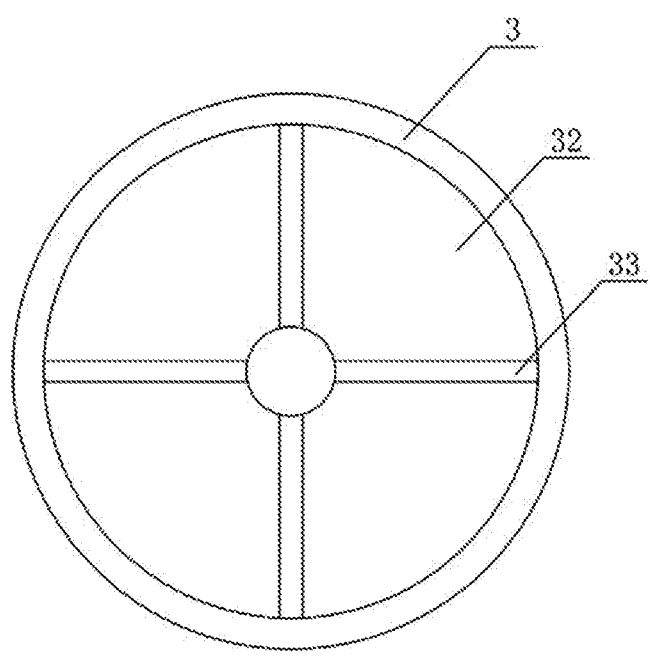

As shown in FIG. 1 and FIG. 2, an embodiment of an hourglass type air spring assembly in the present invention comprises an upper cover plate 1, an air bag 2, an upper end plate 3 and a lower end plate 4. An outer periphery of the upper cover plate 1 is connected with an outer periphery of the upper end plate 3 through the air bag 2. A low-position hourglass elastomer 5 and a high-position elastomer 6 which are integrally formed are connected with each other between the upper end plate 3 and the lower end plate 4. An annular notch 7 is formed between the low-position hourglass elastomer 5 and the high-position elastomer 6, and an annular rigid partition plate 8 matched with the annular notch is arranged in the annular notch 7. In this structure, the low-position hourglass elastomer 5 and the high-position elastomer 6 which are integrally formed constitute a serial structure which increases the elevation of the elastomer between the upper end plate 3 and the lower end plate 4, thereby greatly reducing the heavy-load vertical rigidity of the secondary spring and improving the comfort of the secondary spring at heavy loads. In addition, while the elevation increases, the transverse displacement of the elastomer between the upper end plate 3 and the lower end plate 4 is also increased. In this structure, the low-position hourglass elastomer 5 is incompletely isolated from the high-position elastomer 6 through the coordination of the annular rigid partition plate 8 and the annular notch 7, which is arranged between the low-position hourglass elastomer 5 and the high-position elastomer 6, and so as to avoid the transverse deformation of the secondary spring and improve the stability of the transverse displacement of the secondary spring. In this structure, the annular rigid partition plate 8 is coordinated with the annular notch 7, and the annular rigid partition plate 8 is simple in structure. The annular rigid partition plate 8 will not damage the low-position hourglass elastomer 5 and the high-position elastomer 6 during installation, which improves installation convenience and ensures the completeness of the low-position hourglass elastomer 5 and the high-position elastomer 6.

In this embodiment, a bottom surface of the annular rigid partition plate 8 is set as a flat surface, and a top surface of the annular rigid partition plate 8 is formed by a flat surface portion and an inclined surface portion. The flat surface portion on a top part of the annular rigid partition plate 8 is close to an outer periphery of the annular rigid partition plate 8, and a low position of the inclined surface portion of the annular rigid partition plate 8 is close to an inner ring of the annular rigid partition plate 8. In this structure, the annular rigid partition plate 8 is of wedge ring structure which is big outside and small inside, and the provision of the inclined surface makes the opposite inclined surface restrict the secondary spring during transverse displacement, so as to prevent its transverse deformation. While provision of the upper and lower flat surfaces can keep the vertical stresses of the low-position hourglass elastomers 5 and the high-position elastomers 6 uniform.

In this embodiment, the outer periphery of the annular rigid partition plate 8 is provided with a fail-safe gap 81. The fail-safe gap 81 effectively avoids reverse installation of the annular rigid partition plate 8 in the vulcanization process, and after vulcanization, the annular rigid partition plate 8 can also be detected whether it is installed reversely or not through observing the appearance of the secondary spring.

In this embodiment, the fail-safe gap 81 is located outside of the annular notch 7. Such setting makes the annular rigid partition plate 8 is integrally extended to the outside of the annular notch 7, and the annular rigid partition plate 8 is convenient for installation.

In this embodiment, an inner cavity 9 is provided in a center of the low-position hourglass elastomer 5 and a center of the high-position elastomer 6, and a bottom center of the upper end plate 3 is provided with a stop part 31 extending to the inner cavity 9. The stop part 31 ensures the overall settlement of the vehicle and keeps there is no interference between the vehicle body and the bogie at high loads and dynamic loads, etc.

In this embodiment, a top surface of the upper end plate 3 is provided with a counter bore 32 for losing weight. The provision of the counter bore 32 can reduce the weight of the spring assembly and the total weight of the system.

In this embodiment, the counter bore 32 is internally provided with a plurality of spaced-apart rib plates 33. A top part of the upper end plate 3 is provided with a wearing plate 10 which is fastened with each of the rib plates 33. The wearing plate 10 is mainly used for avoiding loss of the upper end plate 3, and the wearing plate 10 is fastened with the rib plate 33 for facilitating installation.

In this embodiment, a bottom part of an outer peripheral face of the upper cover plate 1 is provided with a retaining ring 11. One end of the air bag 2 is buckled with the retaining ring 11, and the other end of the air bag 2 is connected with the upper end plate 3. In this structure, the joint between the upper end plate 3 and a small opening of the air bag 2 is protected by rubber vulcanization, thereby relieving the abrasion of the small opening of the air bag 2 at heavy loads, and improving the useful life of the air bag 2 and the secondary spring.

While the preferred embodiments of the present invention have been disclosed as above, they are not intended to limit the present invention. Any person skilled in the art, without departing from the scope of the technical solution of the present invention, can take advantage of the above-described technical content to make many possible variations and modifications of the present invention, or equivalent embodiments with equivalent change. Therefore, all the contents without departing from the technical solution of the present invention, based on any simple modification, equivalent variations and modifications of the present invention made by the technical essence of the present invention for the above embodiment, would fall within the protection scope of the technical solution of the present invention.

What is claimed is:

1. A hourglass type air spring assembly, comprising an upper cover plate, an air bag, an upper end plate and a lower end plate, wherein an outer periphery of the upper cover plate is connected with an outer periphery of the upper end plate through the air bag; a low-position hourglass elastomer and a high-position elastomer which are integrally formed are connected with each other between the upper end plate and the lower end plate, and an annular notch is formed between the low-position hourglass elastomer and the high-position elastomer, and an annular rigid partition plate matched with the annular notch is arranged in the annular notch, wherein a bottom surface of the annular rigid partition plate is set as a flat surface, and a top surface of the annular rigid partition plate is formed by a flat surface portion and an inclined surface portion; the flat surface portion of the annular rigid partition plate is close to an outer periphery of the annular rigid partition plate, and a low position of the inclined surface portion of the annular rigid partition plate is close to an inner ring of the annular rigid partition plate, an inner cavity is provided in a center of the low-position hourglass elastomer and a center of the high-position elastomer, and a bottom center of the upper end plate is provided with a stop part extending to the inner cavity.

2. The hourglass type air spring assembly according to claim 1, wherein the outer periphery of the annular rigid partition plate is provided with a fail-safe gap.

3. The hourglass type air spring assembly according to claim 2, wherein the fail-safe gap is located outside of the annular notch.

4. The hourglass type air spring assembly according to claim 3, wherein a bottom part of an outer peripheral face of the upper cover plate is provided with a retaining ring; one end of the air bag is buckled with the retaining ring, and the other end of the air bag is connected with the upper end plate.

5. The hourglass type air spring assembly according to claim 2, wherein a bottom part of an outer peripheral face of the upper cover plate is provided with a retaining ring; one end of the air bag is buckled with the retaining ring, and the other end of the air bag is connected with the upper end plate.

6. The hourglass type air spring assembly according to claim 1, wherein a top surface of the upper end plate is provided with a counter bore for losing weight.

7. The hourglass type air spring assembly according to claim 6, wherein the counter bore is internally provided with a plurality of spaced-apart rib plates; a top part of the upper end plate is provided with a wearing plate which is fastened with each of the rib plates.

8. The hourglass type air spring assembly according to claim 7, wherein a bottom part of an outer peripheral face of the upper cover plate is provided with a retaining ring; one end of the air bag is buckled with the retaining ring, and the other end of the air bag is connected with the upper end plate.

9. The hourglass type air spring assembly according to claim 1, wherein a bottom part of an outer peripheral face of the upper cover plate is provided with a retaining ring; one end of the air bag is buckled with the retaining ring, and the other end of the air bag is connected with the upper end plate.

\* \* \* \* \*